US012118938B2

(12) United States Patent
Guo et al.

(10) Patent No.: US 12,118,938 B2
(45) Date of Patent: Oct. 15, 2024

(54) PIXEL CIRCUIT AND DRIVING METHOD THEREOF, AND DISPLAY PANEL

(71) Applicant: YUNGU (GU'AN) TECHNOLOGY CO., LTD., Hebei (CN)

(72) Inventors: Enqing Guo, Langfang (CN); Cuili Gai, Langfang (CN); Junfeng Li, Langfang (CN); Fa-Hsyang Chen, Langfang (CN); Kangguan Pan, Langfang (CN); Rubo Xing, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 18/240,713

(22) Filed: Aug. 31, 2023

(65) Prior Publication Data

US 2023/0410745 A1 Dec. 21, 2023

Related U.S. Application Data

(63) Continuation of application No. PCT/CN2022/108517, filed on Jul. 28, 2022.

(30) Foreign Application Priority Data

Nov. 25, 2021 (CN) ........................ 202111415705.6

(51) Int. Cl.
*G09G 3/3233* (2016.01)

(52) U.S. Cl.
CPC ... *G09G 3/3233* (2013.01); *G09G 2300/0465* (2013.01); *G09G 2300/0819* (2013.01);
(Continued)

(58) Field of Classification Search
CPC ......... G09G 3/3233; G09G 2300/0465; G09G 2300/0819; G09G 2300/0852; G09G 2300/0861; G09G 2320/0233
See application file for complete search history.

(56) References Cited

U.S. PATENT DOCUMENTS

2019/0355291 A1* 11/2019 Kim ........................ G09G 3/006
2019/0355301 A1* 11/2019 Lee ...................... G09G 3/3275
(Continued)

FOREIGN PATENT DOCUMENTS

CN 103247262 A 8/2013
CN 105810144 A 7/2016
(Continued)

OTHER PUBLICATIONS

Office Action issued on Jun. 20, 2023, in corresponding Chinese Application No. 202111415705.6, 20 pages.
(Continued)

*Primary Examiner* — Sejoon Ahn
(74) *Attorney, Agent, or Firm* — Maier & Maier, PLLC

(57) ABSTRACT

A pixel circuit, a driving method thereof, and a display panel. The pixel circuit includes a drive module, a data write module, an auxiliary module, a compensation module, a storage module, a coupling module, and a light-emitting module. The data write module is configured to write a data-voltage-related voltage to a control terminal of the drive module through the auxiliary module. The compensation module is connected between a first terminal of the drive module and the control terminal of the drive module and is configured to compensate for the threshold voltage of the drive module. The coupling module is connected to the compensation module and is configured to adjust the voltage at the control terminal of the drive module according to a received jump voltage by using the compensation module. The storage module is connected to the control terminal of the drive module.

20 Claims, 12 Drawing Sheets

(52) U.S. Cl.
CPC ............... *G09G 2300/0852* (2013.01); *G09G 2300/0861* (2013.01); *G09G 2310/08* (2013.01); *G09G 2320/0233* (2013.01)

(56) References Cited

U.S. PATENT DOCUMENTS

| | | | | |
|---|---|---|---|---|
| 2019/0355307 | A1* | 11/2019 | Nam | G09G 3/2092 |
| 2019/0355309 | A1* | 11/2019 | Miwa | G09G 3/3233 |
| 2019/0355311 | A1* | 11/2019 | Ota | G09G 3/3266 |
| 2019/0355318 | A1* | 11/2019 | Park | H01L 27/124 |
| 2019/0355319 | A1* | 11/2019 | Yatabe | G09G 3/3614 |
| 2019/0355320 | A1* | 11/2019 | Zhang | G09G 3/3677 |
| 2019/0355323 | A1* | 11/2019 | Yamada | G09G 3/3233 |
| 2022/0051625 | A1* | 2/2022 | Lai | G09G 3/3233 |

FOREIGN PATENT DOCUMENTS

| | | | |
|---|---|---|---|
| CN | 107452339 | A | 12/2017 |
| CN | 107767819 | A | 3/2018 |
| CN | 110992880 | A | 4/2020 |
| CN | 111445848 | A | 7/2020 |
| CN | 111816119 | A | 10/2020 |
| CN | 111883044 | A | 11/2020 |
| CN | 112289267 | A | 1/2021 |
| CN | 112382235 | A | 2/2021 |
| CN | 112992055 | A | 6/2021 |
| CN | 113192460 | A | 7/2021 |
| CN | 113284454 | A | 8/2021 |
| CN | 113314073 | A | 8/2021 |
| CN | 113421514 | A | 9/2021 |
| CN | 113436583 | A | 9/2021 |
| CN | 114708832 | A | 7/2022 |
| CN | 114724508 | A | 7/2022 |
| IN | 110085170 | A | 8/2019 |
| JP | 2009128404 | A | 6/2009 |
| KR | 1020190104088 | A | 9/2019 |

OTHER PUBLICATIONS

Office Action issued on Nov. 14, 2022, in corresponding Chinese Application No. 202111415705.6, 22 pages.
Office Action issued on Mar. 2, 2023, in corresponding Chinese Application No. 202111415705.6, 22 pages.
International Search Report Issued on Oct. 9, 2022 in corresponding International Application No. PCT/CN2022/108517, 6 pages.

* cited by examiner

PIXEL CIRCUIT AND DRIVING METHOD THEREOF, AND DISPLAY PANEL

CROSS-REFERENCE TO RELATED APPLICATIONS

This application is a continuation of International Patent Application No. PCT/CN2022/108517, filed on Jul. 28, 2022, which claims priority to Chinese Patent Application No. 202111415705.6 filed on Nov. 25, 2021, disclosures of both of which are incorporated herein by reference in their entireties.

TECHNICAL FIELD

Embodiments of the present application relate to the field of display technology, particularly, a pixel circuit, a driving method thereof, and a display panel.

BACKGROUND

With the continuous development of display technology, organic light-emitting diode (OLED) display panels are widely used in the field of photoelectric display due to their excellent features such as self-luminescence, high brightness, and wide viewing angle.

A display panel generally includes multiple pixel circuits. Each pixel circuit includes a drive transistor for generating a drive signal to drive a light-emitting element to emit light for display. In the related art, there are a large number of vias in the layout of pixel circuits, resulting in a large pixel layout area, not conducive to high pixels per inch (PPI).

SUMMARY

Embodiments of the present application provide a pixel circuit, a driving method thereof, and a display panel to improve the layout of pixel circuits and reduce the pixel layout area, thereby increasing PPI.

In a first aspect, an embodiment of the present application provides a pixel circuit. The pixel circuit includes a drive module, a data write module, an auxiliary module, a compensation module, a storage module, a coupling module, and a light-emitting module.

The data write module is configured to write a data-voltage-related voltage to a control terminal of the drive module through the auxiliary module.

The compensation module is connected between a first terminal of the drive module and the control terminal of the drive module and is configured to compensate for the threshold voltage of the drive module.

The coupling module is connected to the compensation module and is configured to adjust the voltage at the control terminal of the drive module according to a received jump voltage through the compensation module.

The storage module is connected to the control terminal of the drive module and is configured to store the voltage at the control terminal of the drive module. The drive module is configured to provide a drive signal to the light-emitting module according to the voltage at the control terminal to drive the light-emitting module to emit light.

In a second aspect, an embodiment of the present application provides a driving method of a pixel circuit. The pixel circuit includes a drive module, a data write module, an auxiliary module, a compensation module, a storage module, a coupling module, and a light-emitting module. The data write module is connected to the drive module. The compensation module is connected between a first terminal of the drive module and a control terminal of the drive module. The coupling module is connected to the compensation module. The storage module is connected to the control terminal of the drive module.

The driving method of the pixel circuit includes at a data write and threshold compensation stage, controlling the data write module to write a data-voltage-related voltage to the control terminal of the drive module through the auxiliary module and to compensate for the threshold voltage of the drive module through the compensation module; at a compensation adjustment stage, controlling the coupling module to adjust the voltage at the control terminal of the drive module according to a received jump voltage through the compensation module; and at a light emission stage, controlling the drive module to provide a drive signal to the light-emitting module according to the voltage at the control terminal to drive the light-emitting module to emit light.

In a third aspect, an embodiment of the present application provides a display panel. The display panel includes the pixel circuit of any embodiment of the present application.

According to embodiments of the present application, at the data write and threshold compensation stage, the data write module and the compensation module are controlled to respond to different scan signals so that after a data voltage provided by a data line passes through the data write module, the auxiliary module, the drive module, and the compensation module, the data-voltage-related voltage is written to the control terminal of the drive module. In this manner, data write and threshold compensation of the drive module are achieved. After the threshold of the drive module is compensated for, the coupling module couples the jump voltage to the compensation module and finely adjusts the voltage at the control terminal of the drive module through the compensation module so that drive currents generated by different pixel circuits at the same grayscale voltage are consistent, thereby improving the threshold compensation effect and improving the uniformity of the display brightness. Even if the driving frequency varies, a good compensation effect can be achieved by reasonable level coupling. Moreover, the auxiliary module added enables a signal to be transmitted in an active layer, reducing the number of vias, optimizing the layout, reducing the layout area of pixels, and facilitating high PPI.

DETAILED DESCRIPTION

Figure 1:
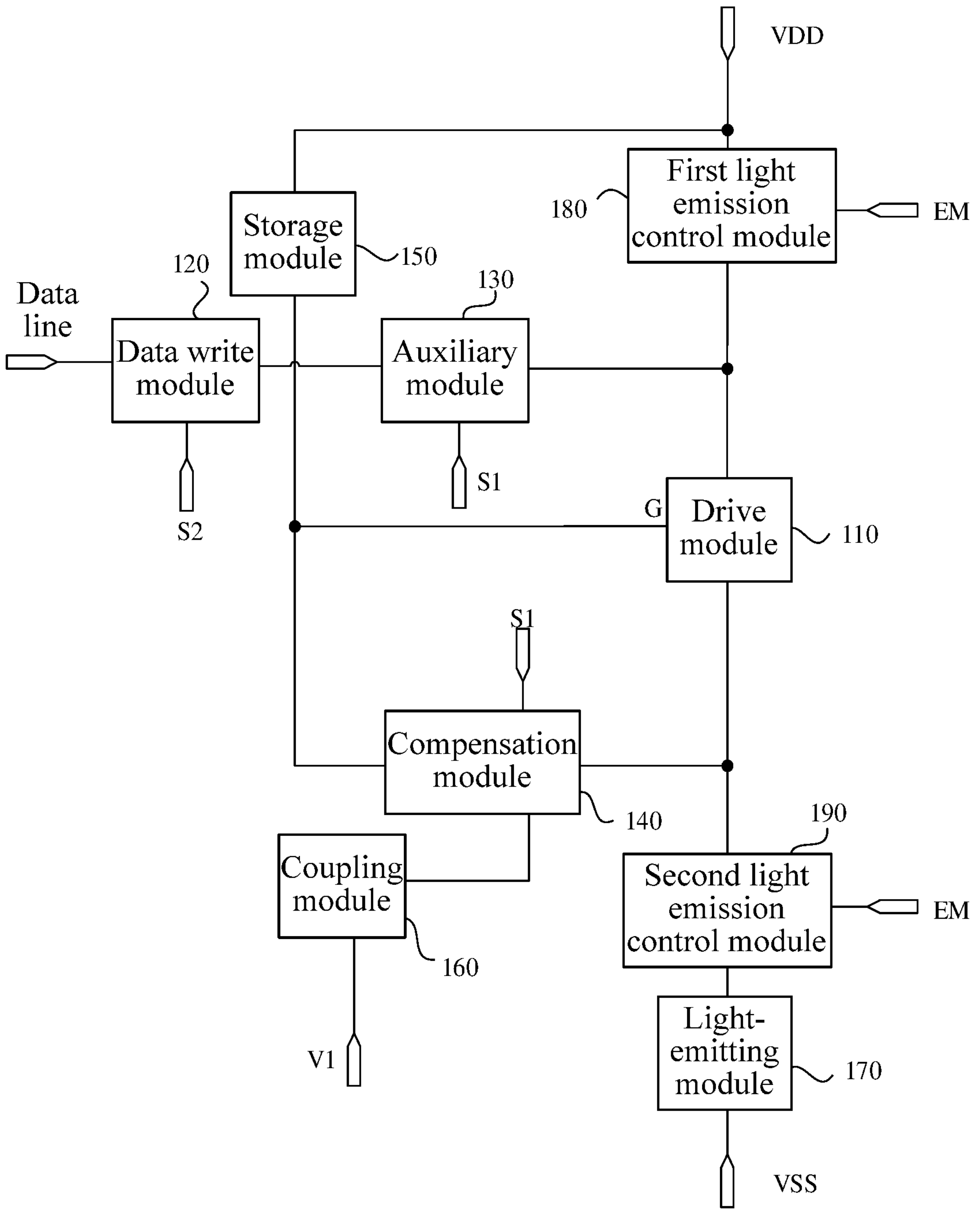
FIG. 1 is a pixel circuit diagram according to an embodiment of the present application.

The present application is further described in detail in conjunction with the drawings and the embodiments. It is to be understood that the embodiments set forth below are intended to illustrate and not to limit the present application. Additionally, it is to be noted that for ease of description, only part, not all, of structures related to the present application are illustrated in the drawings.

FIG. 1 is a pixel circuit diagram according to an embodiment of the present application. Referring to FIG. 1, the pixel circuit of this embodiment of the present application includes a drive module 110, a data write module 120, an auxiliary module 130, a compensation module 140, a storage module 150, a coupling module 160, and a light-emitting module 170.

The data write module 120 is configured to write a data-voltage-related voltage to a control terminal G of the drive module 110 through the auxiliary module 130. The compensation module 140 is connected between a first terminal of the drive module 110 and the control terminal G of the drive module 110 and is configured to compensate for the threshold voltage of the drive module 110. The coupling module 160 is connected to the compensation module 140 and is configured to adjust the voltage at the control terminal G of the drive module 110 according to a received jump voltage V1 through the compensation module 140. The storage module 150 is connected to the control terminal G of the drive module 110 and is configured to store the voltage at the control terminal G of the drive module 110. The drive module 110 is configured to provide a drive signal to the light-emitting module 170 according to the voltage at the control terminal G to drive the light-emitting module 170 to emit light.

In this embodiment, the compensation module 140 is connected between a first terminal of the drive module 110 and the control terminal G of the drive module 110 and is configured to compensate for the threshold voltage of the drive module 110. The coupling module 160 is connected to the compensation module 140 and is configured to finely adjust the voltage at the control terminal G of the drive module 110 after compensation of the threshold voltage, making up for the deficiency that the threshold voltage is not fully compensated for and improving the threshold compensation effect. The operation process of the pixel circuit of this embodiment of the present application may include at least a data write and threshold compensation stage, a compensation adjustment stage, and a light emission stage.

At the data write and threshold compensation stage, the data write module 120, the auxiliary module 130, and the compensation module 140 are turned on; and after a data voltage provided by a data line passes through the data write module 120, the auxiliary module 130, the drive module 110, and the compensation module 140, the data-voltage-related voltage is written to the control terminal G of the drive module 110. Moreover, the compensation module 140 can compensate for the threshold voltage of the drive module 110 so that the voltage at the control terminal G of the drive module 110 can be a voltage associated with the data voltage and the threshold voltage. This voltage is stored in the storage module 150. In this manner, the data voltage write and the threshold voltage compensation of the drive module 110 are achieved.

At the compensation adjustment stage, to avoid incomplete compensation for the threshold voltage of the drive module 110 at the data write and threshold compensation stage, the coupling module 160 couples the jump voltage V1 to an internal node of the compensation module 140 and finely adjusts the voltage at the control terminal G of the drive module 110 through the compensation module. Illustratively, during the compensation process, the compensated voltage at the control terminal G of the drive module 110 is Vdata+Vth. Here Vdata denotes the data voltage on the data line Data, and Vth denotes the threshold voltage of the drive module 110. However, the compensation module 140 is turned on for a short time, so the voltage at the control terminal G of the drive module 110 is not equal to Vdata+Vth; and as the operation of the pixel circuit continues, the subthreshold swing (SS) of the drive module 110 increases, and the voltage at the control terminal G of the drive module 110 changes. As a result, a large error occurs between the voltage at the control terminal G of the drive module 110 and Vdata+Vth after the end of the data write and compensation stage, and thus drive currents generated by different drive modules 110 at the same grayscale voltage are different. At a low grayscale, the drive module 110 operates in a subthreshold region, and a small voltage error at the control terminal G can cause a large change in the drive current, so a small error in the data voltage Vdata can cause a large change in the drive current. The fine adjustment of the voltage at the control terminal G at the compensation adjustment stage ensures that different drive modules 110 generate the same drive current according to voltages at their respective control terminals G, improving the uniformity of the display brightness and thus improving the display effect.

In the layout deployment, at least one metal layer is required to be perforated and wire-changed to an active layer to achieve signal transmission. In this embodiment, the auxiliary module 130 added facilitates a reasonable design to enable a signal to be transmitted in the active layer, reducing the number of vias in the layout, reducing the layout area of pixels, and thus improving PPI.

In the pixel circuit of this embodiment of the present application, at the data write and threshold compensation stage, the data write module and the compensation module are controlled to respond to different scan signals so that after a data voltage provided by a data line passes through the data write module, the auxiliary module, the drive module, and the compensation module, the data-voltage-related voltage is written to the control terminal of the drive module. In this manner, data write and threshold compensation of the drive module are achieved. After the threshold of the drive module is compensated for, the coupling module couples the jump voltage to the compensation module and finely adjusts the voltage at the control terminal of the drive module through the compensation module so that drive currents generated by different pixel circuits at the same grayscale voltage are consistent, thereby improving the threshold compensation effect and improving the uniformity of the display brightness. Even if the driving frequency varies, a good compensation effect can be achieved by reasonable level coupling. Moreover, the auxiliary module added enables a signal to be transmitted in an active layer, reducing the number of vias, optimizing the layout, reducing the layout area of pixels, and facilitating high PPI.

Figure 2:
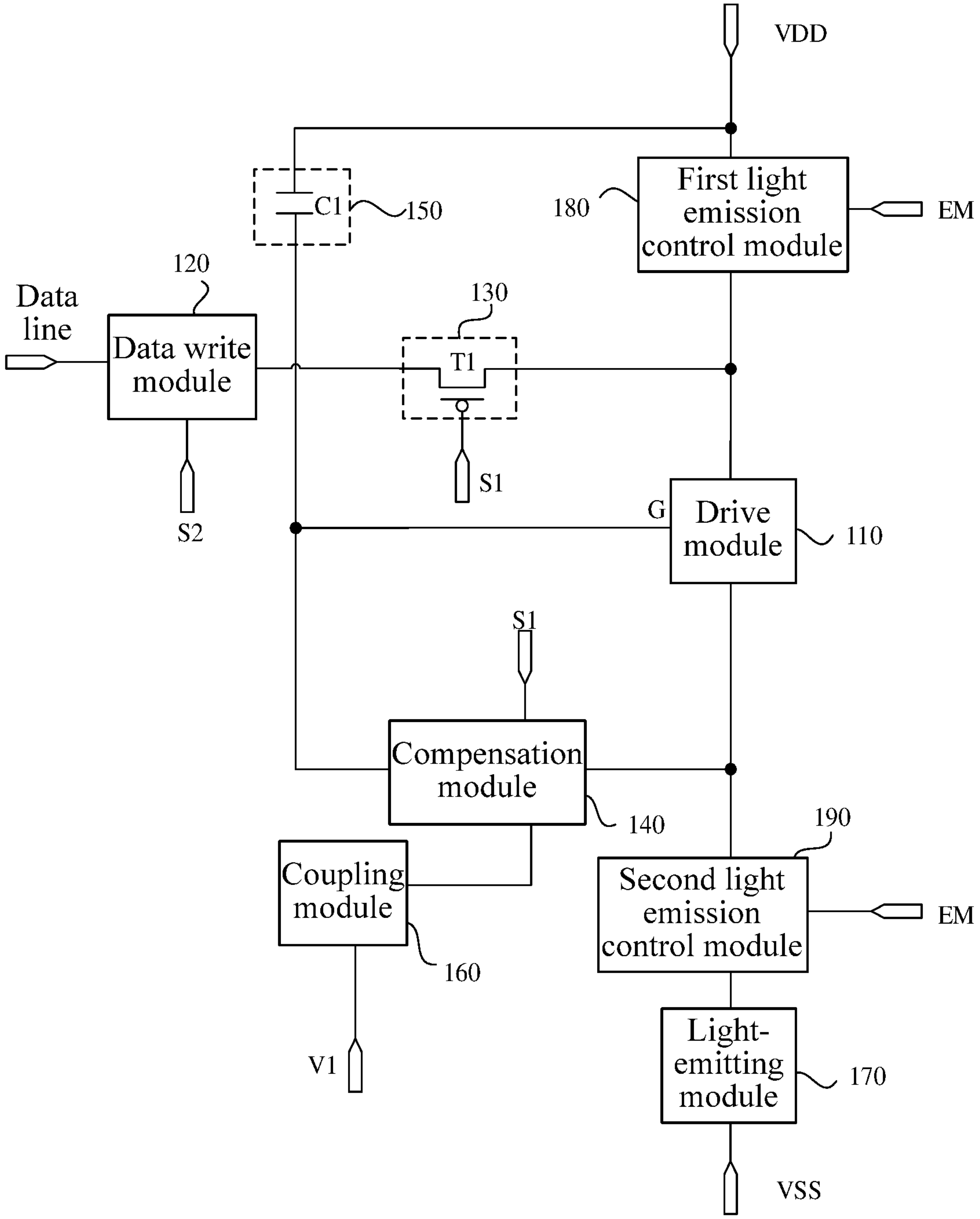
FIG. 2 is another pixel circuit diagram according to an embodiment of the present application.

In an embodiment, FIG. 2 is another pixel circuit diagram according to an embodiment of the present application. Referring to FIG. 2, on the basis of the previous embodiment, the storage module 150 includes a first capacitor C1. A first electrode of the first capacitor C1 is connected to a fixed voltage. A second electrode of the first capacitor C1 is connected to the control terminal G of the drive module 110. Referring to FIG. 2, the auxiliary module 130 includes a first transistor T1. The gate of the first transistor T1 is connected to a first scan line S1. A first electrode of the first transistor T1 is connected to a second terminal of the data write module 120. A second electrode of the first transistor T1 is connected to a second terminal of the drive module 110. A first terminal of the data write module 120 is connected to a data line Data.

In an embodiment, the first capacitor C1 is configured to store the voltage at the control terminal G of the drive module 110. The fixed voltage connected to the first electrode of the first capacitor C1 may be a first supply voltage VDD provided by a first power line or may be another voltage having a constant value. The first transistor T1 and the compensation module 140 are connected to the same scan signal line. The first transistor T1 is connected between the data write module 120 and the second terminal of the drive module 110, so the first transistor T1 does not affect the operation process of the pixel circuit. The drive module 110 generally includes a drive transistor. The gate of the transistor is formed at an overlap between a metal layer and an active layer. A source and a drain are formed at two sides of the gate in the active layer. In the layout deployment, the first transistor T1 is added, and an electrode of the first transistor T1 is formed between the active layer and the metal layer corresponding to the first scan line S1. This deployment makes a signal transmitted in the active layer, saving the trouble of perforation between the active layer and the metal layer and thus reducing the number of vias in the layout.

Figure 3:
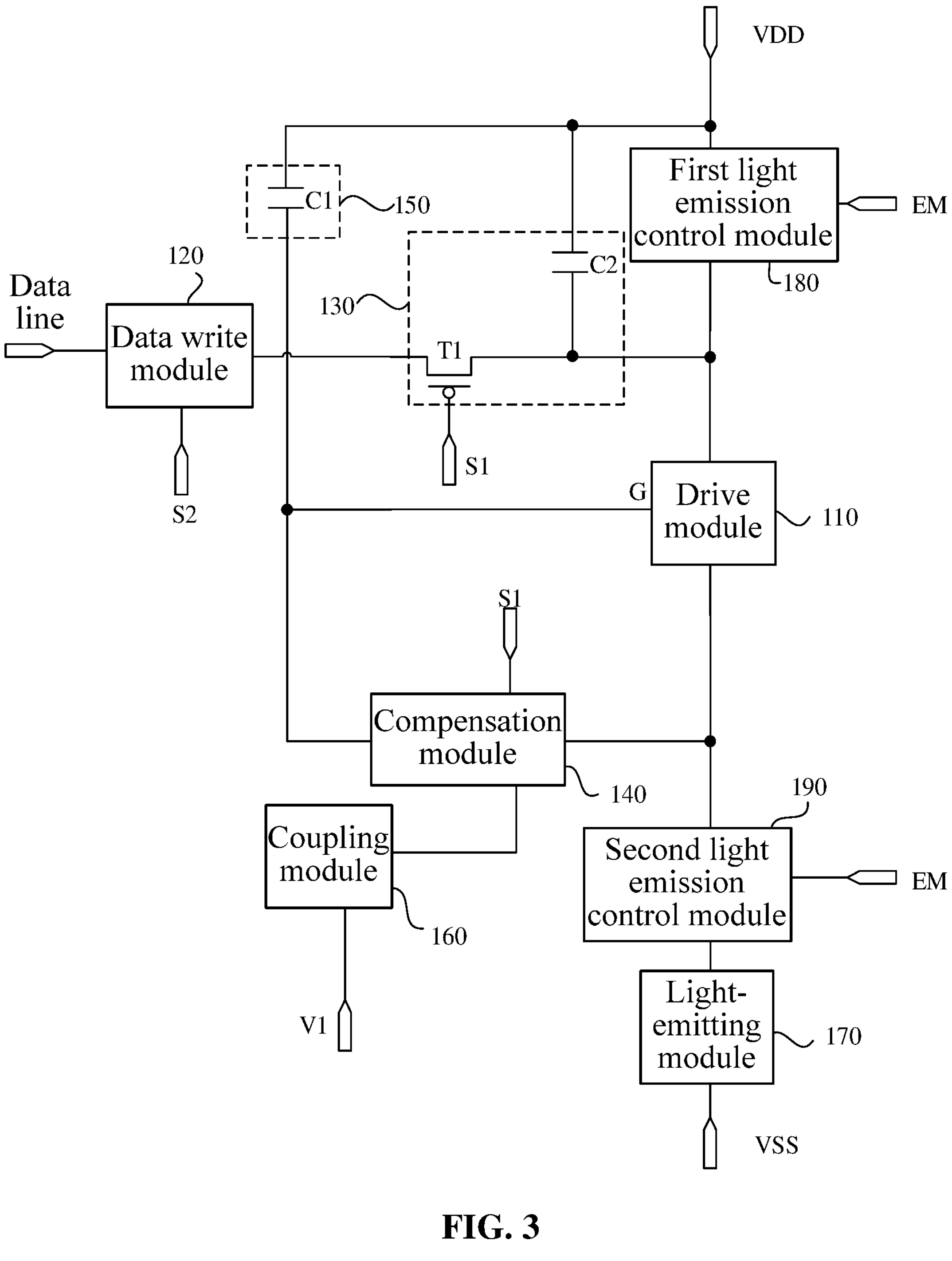
FIG. 3 is another pixel circuit diagram according to an embodiment of the present application.
Figure 4:
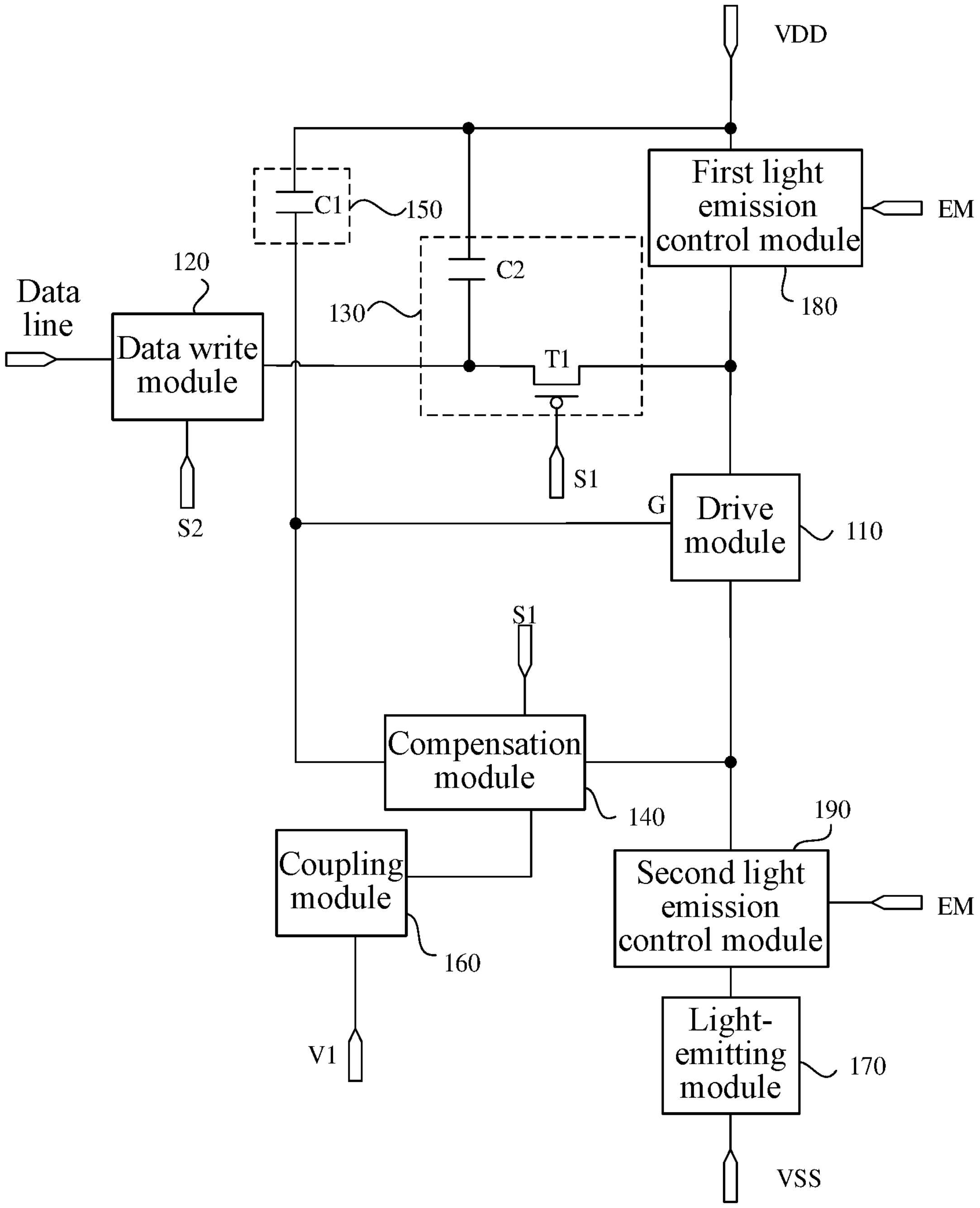
FIG. 4 is another pixel circuit diagram according to an embodiment of the present application.

In an embodiment, FIG. 3 is another pixel circuit diagram according to an embodiment of the present application. FIG. 4 is another pixel circuit diagram according to an embodiment of the present application. On the basis of the previous embodiments, referring to FIGS. 3 and 4, the auxiliary module 130 also includes a second capacitor C2. The gate of the first transistor T1 is connected to a first scan line S1. A first electrode of the first transistor T1 is connected to a second terminal of the data write module 120. A second electrode of the first transistor T1 is connected to a second terminal of the drive module 110. A first terminal of the data write module 120 is connected to a data line Data. A first terminal of the second capacitor C2 is connected to a fixed voltage. A second terminal of the second capacitor C2 is connected to the first electrode of the first transistor T1 or the second electrode of the first transistor T1.

In an embodiment, the fixed voltage connected to the second capacitor C2 may be a first supply voltage VDD. The second capacitor C2 is disposed at the second terminal of the drive module 110 so that the voltage at the second terminal of the drive module 110 is stable and so that the data voltage transmitted on the data line Data can be stored on the second capacitor C2 at the data write and threshold compensation stage. After the data write module 120 is turned off and before the first transistor T1 and the compensation module 140 are turned off, the data voltage stored on the second capacitor C2 continues charging the control terminal G of the drive module 110 through the compensation module 140. When charging the control terminal G of the drive module 110 at a low grayscale, the second capacitor C2 can finely adjust the control terminal G of the drive module 110 because of the small charging current, alleviating subthreshold swing discreteness due to process reasons and compensating for subthreshold swing. Moreover, the first transistor T1 reduces the number of vias of the pixel circuit and thus improves PPI. For details, see the previous related description.

Figure 5:
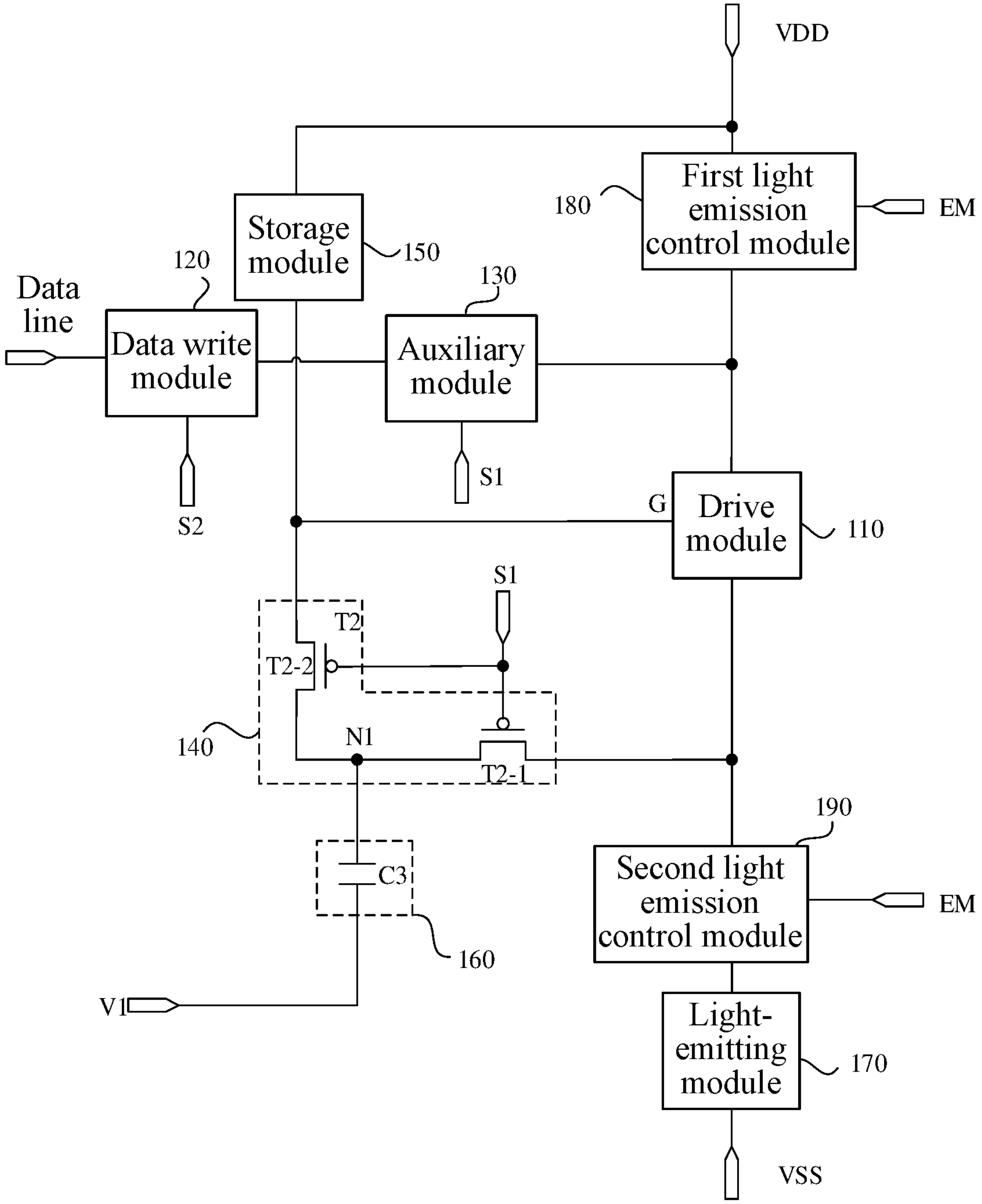
FIG. 5 is another pixel circuit diagram according to an embodiment of the present application.

In an embodiment, FIG. 5 is another pixel circuit diagram according to an embodiment of the present application. On the basis of the previous embodiments, referring to FIG. 5, the compensation module 140 includes a second transistor T2. The second transistor T2 is a double-gate transistor and the second transistor T2 includes a first sub-transistor T2-1 and a second sub-transistor T2-2.

The gate of the first sub-transistor T2-1 and the gate of the second sub-transistor T2-2 are each connected to a first scan line S1. A first electrode of the first sub-transistor T2-1 is connected to the first terminal of the drive module 110. A second electrode of the first sub-transistor T2-1 is connected to a first electrode of the second sub-transistor T2-2. A second electrode of the second sub-transistor T2-2 is connected to the control terminal G of the drive module 110. The coupling module 160 includes a third capacitor C3. A first electrode of the third capacitor C3 is connected to the pulse voltage. A second electrode of the third capacitor C3 is connected to the first electrode of the second sub-transistor T2-2.

In an embodiment, at the data write and threshold compensation stage, the data write module 120 is turned on in response to a scan signal on a second scan line S2; the auxiliary module 130 and the second transistor T2 are turned on in response to a scan signal on the first scan line S1; and after a data voltage on a data line passes through the data write module 120, the auxiliary module 130, the drive module 110, and the second transistor T2, the data-voltage-related voltage is written to the control terminal G of the drive module 110, and the second transistor T2 compensates for the threshold voltage of the drive module 110. Then, the data write module 120 is turned off in response to the scan signal on the second scan line S2. When the second transistor T2 is turned off in response to the scan signal on the first scan line S1, the pulse voltage at the first electrode of the third capacitor C3 jumps and is coupled by the third capacitor C3 to change the potential at the first node N1. Since the second transistor T2 is off, and the potential at the control terminal G of the drive module 110 is not equal to the potential at the first node N1, that is, there is a voltage difference between the control terminal G of the drive module 110 and the first node N1, the voltage at the control terminal G of the drive module 110 can be finely adjusted when the second sub-transistor T2-2 leaks such that drive currents generated by drive modules 110 of different pixel circuits are consistent at a low grayscale, thereby improving the threshold compensation effect and the uniformity of the display brightness when the threshold compensation of the drive module 110 is insufficient at the data write and threshold compensation stage.

Table 1 describes the luminance values of nine points in a 32-grayscale panel acquired using a 7T1C pixel circuit in the related art. Table 2 describes the luminance values of nine points in a 32-grayscale panel acquired using the pixel circuit of this embodiment of the present application.

As can be seen from data in Table 1 and Table 2, the compensated voltage at the control terminal G of the drive module 110 is adjusted so that the uniformity of the display brightness is significantly improved at the same grayscale and thus the compensation effect is improved.

TABLE 1

| | | | |
|---|---|---|---|
| Luminance | 5.556 | 5.681 | 5.393 |
| Value | 5.803 | 5.829 | 5.694 |
| | 6.239 | 6.439 | 6.349 |
| Uniformity | | 83.76% | |

TABLE 2

| | | | |
|---|---|---|---|
| Luminance | 4.39 | 4.461 | 4.302 |
| Value | 4.583 | 4.626 | 4.369 |
| | 4.65 | 4.705 | 4.579 |
| Uniformity | | 91.43% | |

Figure 6:
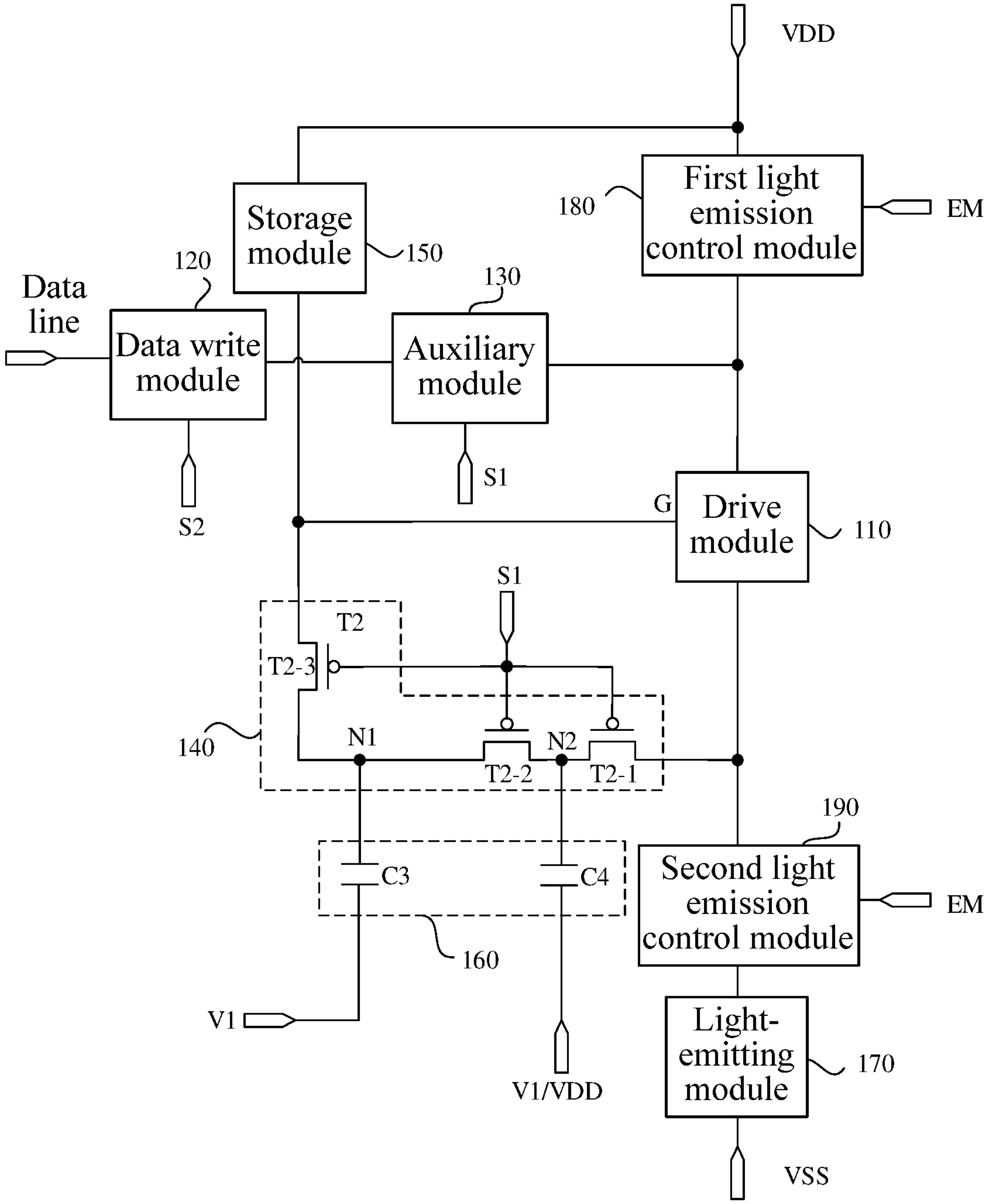
FIG. 6 is another pixel circuit diagram according to an embodiment of the present application.

In an embodiment, FIG. 6 is another pixel circuit diagram according to an embodiment of the present application. On the basis of each previous embodiment, referring to FIG. 6, the compensation module 140 includes a second transistor T2. The second transistor T2 is a tri-gate transistor. The second transistor T2 includes a first sub-transistor T2-1, a second sub-transistor T2-2, and a third sub-transistor T2-3.

The gate of the first sub-transistor T2-1, the gate of the second sub-transistor T2-2, and the gate of the third sub-transistor T2-3 are each connected to a first scan line S1. A first electrode of the first sub-transistor T2-1 is connected to the first terminal of the drive module 110. A second electrode of the first sub-transistor T2-1 is connected to a first electrode of the second sub-transistor T2-2. A second electrode of the second sub-transistor T2-2 is connected to a first electrode of the third sub-transistor T2-3. A second electrode of the third sub-transistor T2-3 is connected to the control terminal G of the drive module 110. The coupling module 160 is configured to couple the jump voltage V1 to the first electrode of the second sub-transistor T2-2 and/or the second electrode of the second sub-transistor T2-2.

In this embodiment, the coupling module 160 includes a third capacitor C3 and a fourth capacitor C4. A first electrode of the third capacitor C3 is connected to a pulse voltage. A second electrode of the third capacitor C3 is connected to the second electrode of the second sub-transistor T2-2. A first electrode of the capacitor C4 is connected to a pulse voltage or a fixed voltage. A second electrode of the capacitor C4 is connected to the first electrode of the second sub-transistor T2-2. At the data write and threshold compensation stage, the data write module 120 is turned on in response to a scan signal on a second scan line S2; the auxiliary module 130 and the second transistor T2 are turned on in response to a scan signal on the first scan line S1; and after a data voltage on a data line passes through the data write module 120, the auxiliary module 130, the drive module 110, and the second transistor T2, the data-voltage-related voltage is written to the control terminal G of the drive module 110, and the second transistor T2 compensates for the threshold voltage of the drive module 110. Then the data write module 120 is turned off in response to the scan signal on the second scan line S2. When the second transistor T2 is turned off in response to the scan signal on the first scan line S1 and when the first electrode of the fourth capacitor C4 is connected to a pulse voltage, since the third capacitor C3 and the fourth capacitor C4 are each connected to a pulse voltage, after the first sub-transistor T2-1, the second sub-transistor T2-2, and the third sub-transistor T2-3 are turned off, the level of the jump voltage V1 jumps, the third capacitor C3 couples the jump voltage V1 to the first node N1, the fourth capacitor C4 couples the jump voltage V1 to the second node N2, and the potential of the second node N2 and the potential of the first node N1 change simultaneously. The second transistor T2 is in off and there is a voltage difference between the potential of the control terminal G of the drive module 110 and the potential of the first node N1 or the second node N2, so the voltage at the control terminal G of the drive module 110 can be finely adjusted. The voltage at the control terminal G of the drive module 110 can be finely adjusted when the second sub-transistor T2-2 leaks such that drive currents generated by drive modules 110 of different pixel circuits are consistent at a low grayscale, thereby improving the threshold compensation effect and the uniformity of the display brightness when the threshold compensation of the drive module 110 is insufficient at the data write and threshold compensation stage.

With continued reference to FIG. 6, the first electrode of the fourth capacitor C4 is connected to a fixed voltage. For example, the first electrode of the fourth capacitor C4 is connected to a first supply voltage VDD provided by a first power line. Of course, in other embodiments, the fixed voltage may be another voltage having a stable value. Since the fixed voltage does not jump, the fourth capacitor C4 can maintain the stability of the potential of the second node N2, reducing current leakage between the control terminal G of the drive module 110 and the compensation module 140, facilitating a fine adjustment of the voltage at the control terminal G of the drive module 110.

Figure 7:
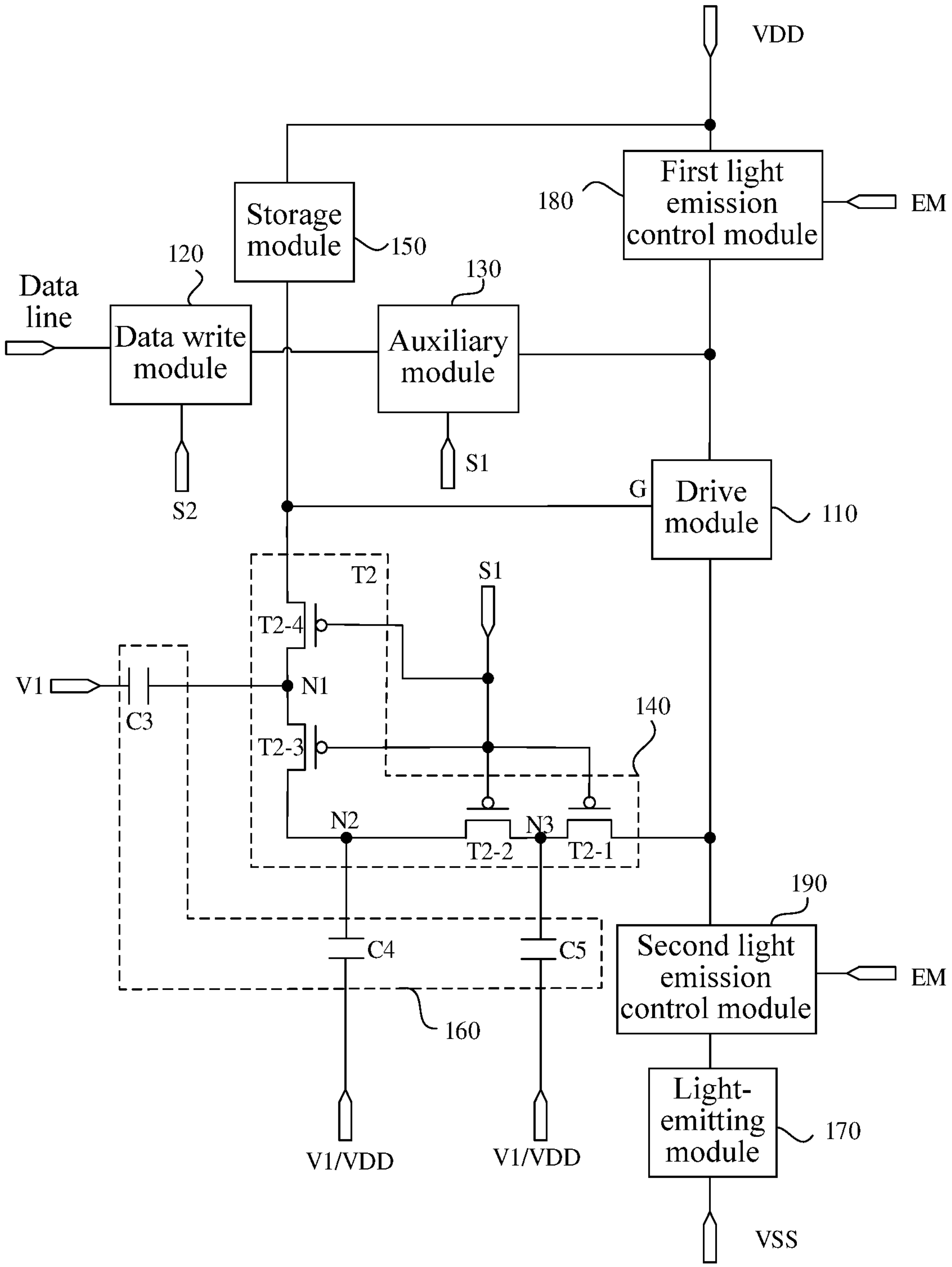
FIG. 7 is another pixel circuit diagram according to an embodiment of the present application.

In an embodiment, FIG. 7 is another pixel circuit diagram according to an embodiment of the present application. On the basis of the previous embodiments, referring to FIG. 7, the compensation module 140 includes a second transistor T2. The second transistor T2 is a four-gate transistor. The second transistor T2 includes a first sub-transistor T2-1, a second sub-transistor T2-2, a third sub-transistor T2-3, and a fourth sub-transistor T2-4.

The gate of the first sub-transistor T2-1, the gate of the second sub-transistor T2-2, the gate of the third sub-transistor T2-3, and the gate of the fourth sub-transistor T2-4 are each connected to the first scan line S1. The first electrode of the first sub-transistor T2-1 is connected to the first terminal of the drive module 110. The second electrode of the first sub-transistor T2-1 is connected to a first electrode of the second sub-transistor T2-2. A second electrode of the second sub-transistor T2-2 is connected to a first electrode of the third sub-transistor T2-3. A second electrode of the third sub-transistor T2-3 is connected to a first electrode of the fourth sub-transistor T2-4. A second electrode of the fourth sub-transistor T2-4 is connected to the control terminal G of the drive module 110. The coupling module 160 is configured to couple the jump voltage V1 to at least one of the first electrode of the second sub-transistor T2-2, the second electrode of the second sub-transistor T2-2, or the second electrode of the third sub-transistor T2-3.

In this embodiment, the coupling module 160 includes a third capacitor C3, a fourth capacitor C4, and a fifth capacitor C5. A first electrode of the third capacitor C3 is connected to the pulse voltage. A second electrode of the third capacitor C3 is connected to the second electrode of the third sub-transistor T2-3. A first electrode of the fourth capacitor C4 is connected to the pulse voltage or a fixed voltage. A second electrode of the fourth capacitor C4 is connected to the second electrode of the second sub-transistor T2-2. A first electrode of the fifth capacitor C5 is connected to the pulse voltage or a fixed voltage. A second electrode of the fifth capacitor C5 is connected to the second electrode of the first sub-transistor T2-1. Compared with the pixel circuit structure of FIG. 6, in the pixel circuit of FIG. 7, the second transistor T2 is changed from a tri-gate transistor to a four-gate transistor, and a fifth capacitor C5 is added. The operation principle of the pixel circuit of FIG. 7 is the same as the preceding and thus is not described here.

In this embodiment, the jump voltage V1 is a pulse voltage. The pulse of the voltage signal of the jump voltage V1 is after the pulse on the first pulse signal S2 transmitted by the first scan line. That is, the pulse voltage is configured to experience a level jump when the compensation module 140 is turned off. That is, after the compensation of the threshold of the drive module 110 is completed for the pixel circuit through the compensation module 140, the compensation module 140 is turned off. At this time, the pulse voltage jumps (the amount of voltage change of the voltage jump may be set according to the actual situation). Since the potential at one terminal of the coupling module 160 changes, the coupling effect of the coupling module 160 is triggered, and the amount of voltage change of the voltage at one terminal of the coupling module 160 is coupled to the other terminal so that the voltage at a node inside the compensation module 140 changes. Since the compensation module 140 has been turned off, the voltage at the control terminal G of the drive module 110 can be finely adjusted such that the drive current can be adjusted, improving the compensation effect of the threshold and ensuring consistency of the drive currents generated by the drive module 110.

Figure 8:
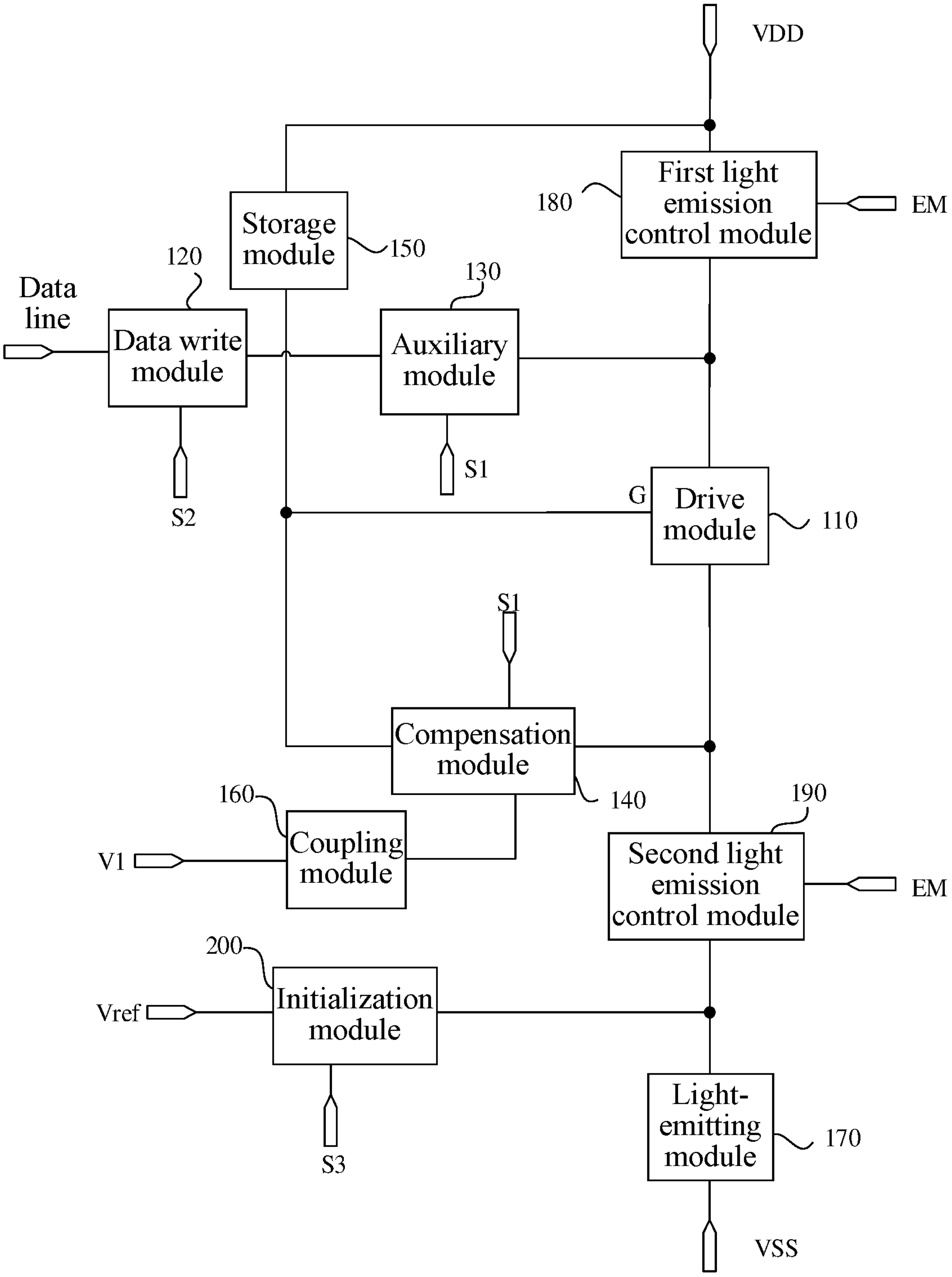
FIG. 8 is another pixel circuit diagram according to an embodiment of the present application.

In an embodiment, FIG. 8 is another pixel circuit diagram according to an embodiment of the present application. Referring to FIG. 8, on the basis of each previous embodiment, the pixel circuit of this embodiment of the present application also includes an initialization module 200, a first light emission control module 180, and a second light emission control module 190. The initialization module 200 is connected between an initialization signal line Vref and a first terminal of the light-emitting module 170. The first light emission control module 180 is connected between the supply voltage line and the second terminal of the drive module 17. The second light emission control module 190 is connected between the first terminal of the drive module 110 and the first terminal of the light-emitting module 170.

Figure 9:
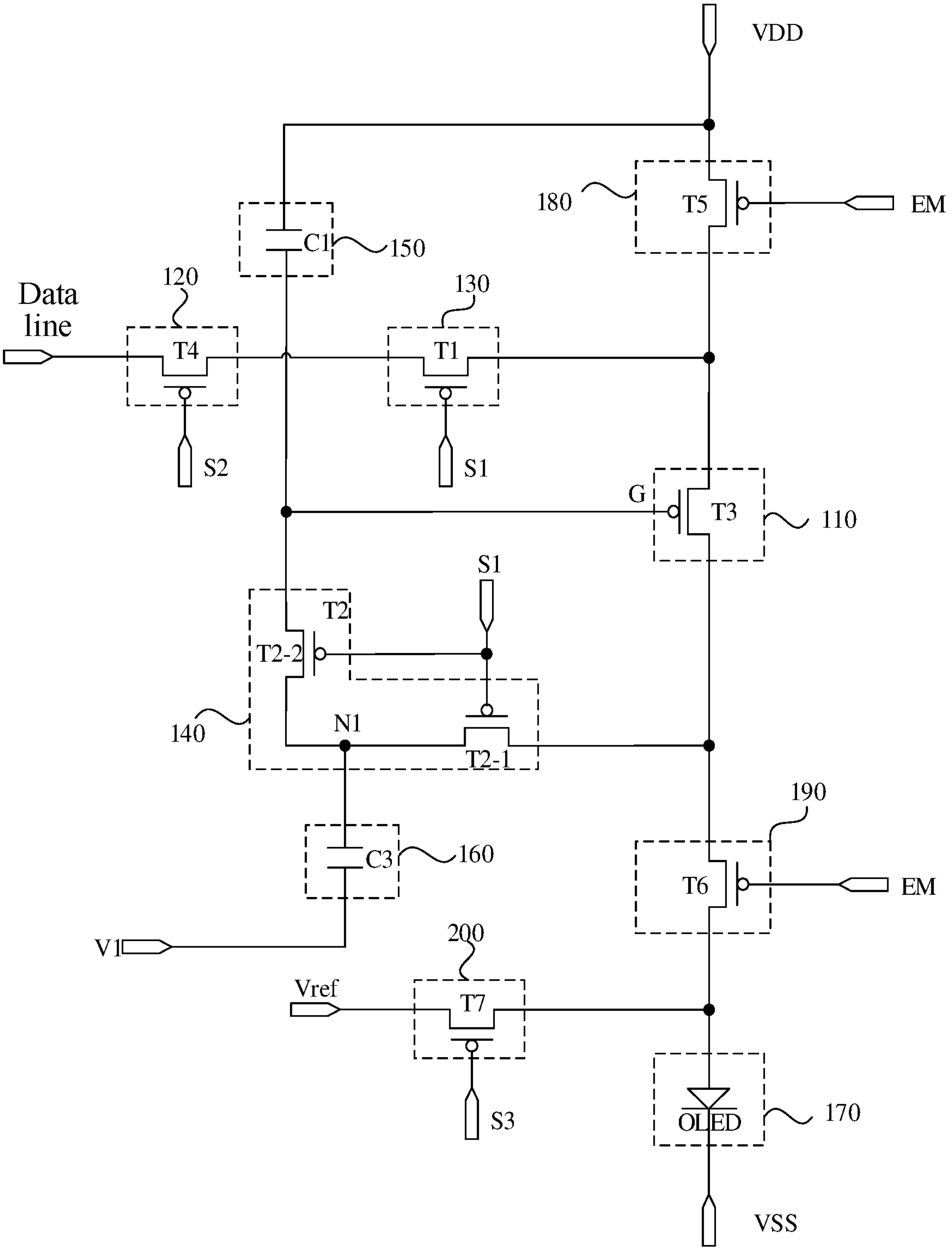
FIG. 9 is another pixel circuit diagram according to an embodiment of the present application.

In an embodiment, FIG. 9 is another pixel circuit diagram according to an embodiment of the present application and shows the structure of the pixel circuit of FIG. 8. Referring to FIG. 9, the following gives a description through an example in which the second transistor T2 is a double-gate transistor. The drive module 110 includes a third transistor T3. The data write module 120 includes a fourth transistor T4. The first light emission control module 180 includes a fifth transistor T5. The second light emission control module 190 includes a sixth transistor T6. The initialization module 200 includes a seventh transistor T7. The gate of the fourth transistor T4 is connected to a second scan line S2. A first electrode of the fourth transistor T4 is connected to a data line Data. A second electrode of the fourth transistor T4 is connected to a first electrode of the third transistor T3 through the auxiliary module 130. A first electrode of the fifth transistor T5 is connected to a first power line VDD. A second electrode of the fifth transistor T5 is connected to the first electrode of the third transistor T3. A second electrode of the third transistor T3 is connected to a first terminal of the light-emitting module 170 through the sixth transistor T6. A second terminal of the light-emitting module 170 is connected to a second power line VSS. The gate of the fifth transistor T5 and the gate of the sixth transistor T6 are each connected to a light emission control signal line EM. The first electrode of the seventh transistor T7 is connected to the initialization signal line Vref, the second electrode of the seventh transistor T7 is connected to the first terminal of the light-emitting module 170, and the gate of the seventh transistor T7 is connected to the third scan line S3. The fifth transistor T5 and the sixth transistor T6 are configured to be on at an initialization stage and a light emission stage.

In this embodiment, a signal line and a voltage transmitted on the signal line are denoted by the same mark, and the light-emitting module 170 may be an OLED.

Figure 10:
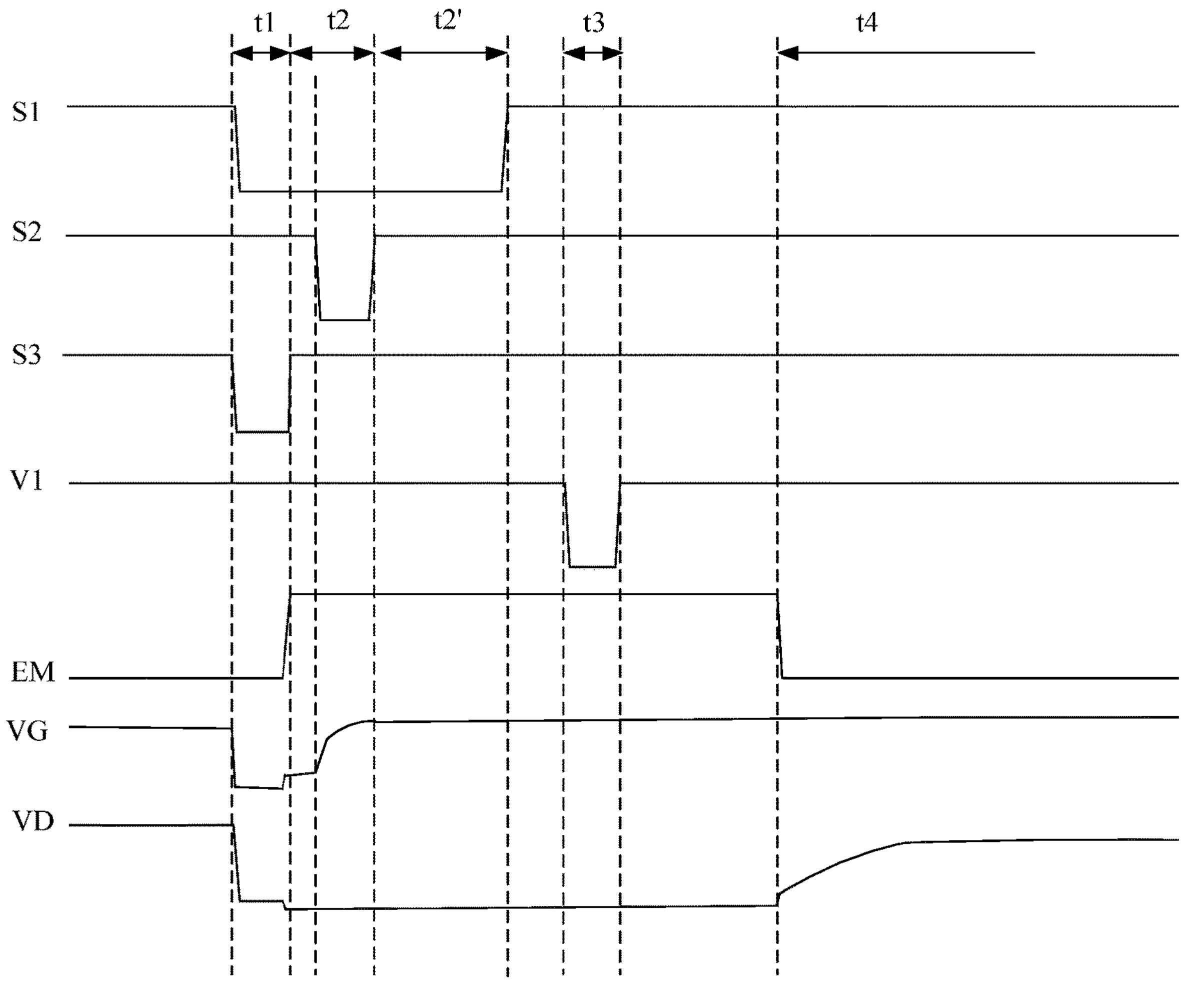
FIG. 10 is a control timing diagram of a pixel circuit according to an embodiment of the present application.

FIG. 10 is a control timing diagram of a pixel circuit according to an embodiment of the present application. FIG. 10 is applicable to the pixel circuit of FIG. 9. This embodiment illustrates that the first transistor T1, the second transistor T2, the third transistor T3, the fourth transistor T4, the fifth transistor T5, the sixth transistor T6, and the seventh transistor T7 are each a p-type transistor. Referring to FIGS. 9 and 10, the operation process of the pixel circuit of this embodiment of the present application may include an initialization stage t1, a data write and threshold compensation stage t2, a compensation adjustment stage t3, and a light emission stage t4.

At the initialization stage t1, a first scan signal S1 provided by the first scan line is at a low level, a second scan signal S2 provided by the second scan line is at a high level, a third scan signal S3 provided by the third scan signal line is at a low level, and a light emission control signal EM provided by the light emission control signal line is at a low level; and the first transistor T1 and the second transistor T2 are turned on in response to the first scan signal S1, the fourth transistor T4 is turned off in response to the second scan signal S2, the fifth transistor T5 and the sixth transistor T6 are turned on in response to the light emission control signal EM, the seventh transistor T7 is turned on in response to the third scan signal S3, the initialization voltage Vref on the initialization signal line is transmitted to the first electrode of the OLED and is transmitted to the gate of the third transistor T3 through the sixth transistor T6 and the second transistor T2 to initialize the potential of the gate of the third transistor T3 and the potential of the first electrode of the OLED. VG denotes the gate voltage of the third transistor T3. VD denotes the first-electrode voltage of the OLED. Meanwhile, the fifth transistor T5 is turned on, and the third transistor T3 is turned on by the configured initialization voltage Vref; therefore, a path is formed between the first power line VDD, the fifth transistor T5, the third transistor T3, the sixth transistor T6, the seventh transistor T7, and the initialization signal line Vref. The third transistor T3 generates a current to flush the charge in the third transistor T3 so that the charge amount in the third transistor T3 is initialized to the charge amount corresponding to the initialization voltage Vref, thereby reducing the characteristic shift of the third transistor T3 caused by the hysteresis effect and thus alleviating afterimage.

Further, the second transistor T2 is a double-gate transistor that has a smaller leakage current than a single-gate transistor. Additionally, there is only one leakage path of the gate voltage of the third transistor T3 so that the stability of the gate voltage of the third transistor T3 can be maintained. Thus, the display effect is improved.

At the data write and threshold compensation stage t2, the first scan signal S1 provided by the first scan line is at a low level, the second scan signal S2 provided by the second scan line is at a low level, the third scan signal S3 provided by the third scan signal line is at a high level, and the light emission control signal EM provided by the light emission control signal line is at a high level; the first transistor T1 and the second transistor T2 continue being turned on in response to the first scan signal S1, the fourth transistor T4 is turned on in response to the second scan signal S2, the fifth transistor T5 and the sixth transistor T6 are turned off in response to the light emission control signal EM, and the seventh transistor T7 is turned off in response to the third scan signal S3; and after the data voltage on the data line Data passes through the fourth transistor T4, the first transistor T1, the third transistor T3, and the second transistor T2, the data-voltage-related voltage is written to the gate of the third transistor T3; and meanwhile, the second transistor T2 compensates for the threshold voltage of the third transistor T3. In this manner, the data voltage write and the threshold voltage compensation of the drive module 110 are achieved. The first capacitor C1 stores the gate voltage of the third transistor T3. The stored voltage is associated with the data voltage and the threshold voltage.

The turn-on time of the second transistor T2 is relatively short, so full compensation of the threshold voltage of the third transistor T3 cannot be guaranteed, and non-uniform display brightness tends to occur at a low grayscale. At the compensation adjustment stage t3, the first scan signal S1 provided by the first scan line is at a high level, the second scan signal S2 provided by the second scan line is at a high level, the third scan signal S3 provided by the third scan signal line is at a high level, and the light emission control signal EM provided by the light emission control signal line is at a high level; and the first transistor T1 and the second transistor T2 are turned off in response to the first scan signal S1, the fourth transistor T4 is turned off in response to the second scan signal S2, the fifth transistor T5 and the sixth transistor T6 are turned off in response to the light emission control signal EM, and the seventh transistor T7 is turned off in response to the third scan signal S3. After the first scan signal S1 jumps from a low level to a high level (that is, after the second transistor T2 is turned oft), the pulse voltage jumps from a high level to a low level. Due to the coupling effect of the third capacitor C3, the potential of the first node N1 changes, resulting in a voltage difference between the gate of the third transistor T3 and the first node. Since the second transistor T2 is off, under the action of leakage of the second sub-transistor T2-2, the gate voltage of the third transistor T3 can be finely adjusted, thereby making up for incomplete compensation for the third transistor T3 to ensure that a consistent drive current is generated by the third transistor T3 to improve the uniformity of the display brightness. Moreover, before the light emission control signal EM jumps (that is, before the OLED emits light), the pulse voltage jumps from a low level to a high level, preventing the third transistor T3 from being unstable in gate potential after the OLED emits light and thus preventing non-uniform display. In this embodiment, the pulse width (low-level maintenance time) of the pulse voltage may be set according to the subthreshold swing fluctuation range of the drive module 110 to make the jump of the pulse voltage alleviate non-uniform display caused by the subthreshold swing fluctuation.

At the light emission stage t4, the first scan signal S1 provided by the first scan line is at a high level, the second scan signal S2 provided by the second scan line is at a high level, the third scan signal S3 provided by the third scan signal line is at a high level, and the light emission control signal EM provided by the light emission control signal line is at a low level; and the first transistor T1 and the second transistor T2 are turned off in response to the first scan signal S1, the fourth transistor T4 is turned off in response to the second scan signal S2, the fifth transistor T5 and the sixth transistor T6 are turned on in response to the light emission control signal EM, and the seventh transistor T7 is turned off in response to the third scan signal S3. The third transistor T3 generates a drive current under the control of its gate voltage. Since the gate voltage has been adjusted in the previous stage, it is possible to ensure that the OLED has the same drive current at the same grayscale voltage at the light emission stage t4, improving the uniformity of the display brightness.

The first transistor T1 serves to improve the layout of pixel circuits without affecting the operation principle of the pixel circuit. The first transistor T1 helps reduce the number of vias in the layout, thereby reducing the layout area of pixel circuits and thus improving the PPI of the display panel. In this embodiment, the second transistor T2 may be replaced with the tri-gate transistor or the four-gate transistor of any previous embodiment, and the fixed voltage may be any one of the first supply voltage VDD or the initialization voltage Vref. For details about the operation principle of the pixel circuit, see related description in the previous embodiments.

Figure 11:
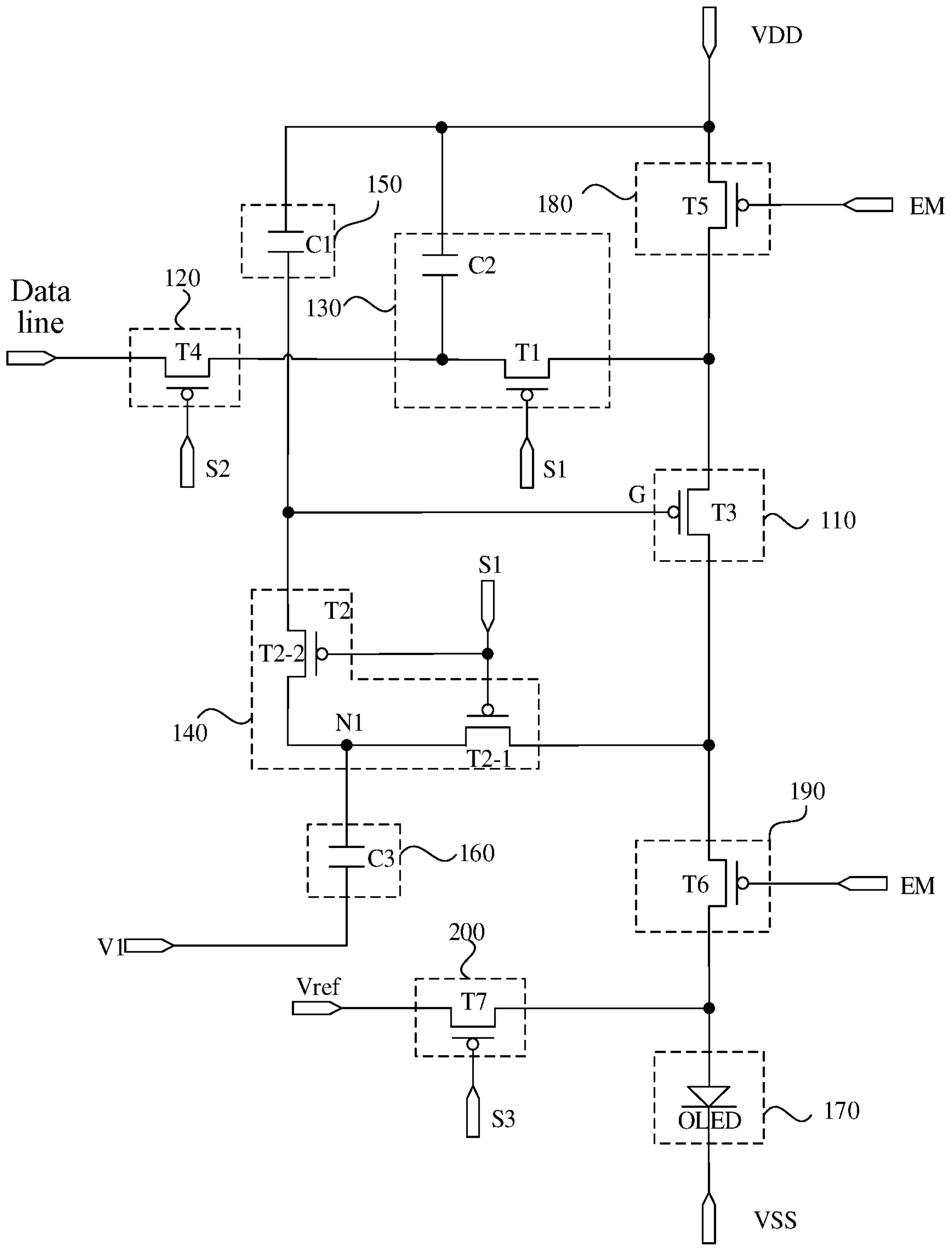
FIG. 11 is another pixel circuit diagram according to an embodiment of the present application.

In an embodiment, FIG. 11 is another pixel circuit diagram according to an embodiment of the present application. Referring to FIGS. 10 and 11, on the basis of the previous embodiment, the auxiliary module 130 of this embodiment includes a first transistor T1 and a second capacitor C2. The second capacitor C2 may be connected to a first electrode of the first transistor T1 or a second electrode of the first transistor T1. In other embodiments, it is feasible to retain the second capacitor C2, with the first transistor T1 omitted. This arrangement does not affect the operation principle of the pixel circuit.

At the data write and threshold compensation stage t2, the first scan signal S1 provided by the first scan line is at a low level, the second scan signal S2 provided by the second scan line is at a low level, the third scan signal S3 provided by the third scan signal line is at a high level, and the light emission control signal EM provided by the light emission control signal line is at a high level; the first transistor T1 and the second transistor T2 are turned on in response to the first scan signal S1, the fourth transistor T4 is turned on in response to the second scan signal S2, the fifth transistor T5 and the sixth transistor T6 are turned off in response to the light emission control signal EM, and the seventh transistor T7 is turned off in response to the third scan signal S3; and after the data voltage on the data line Data passes through the fourth transistor T4, the first transistor T1, the third transistor T3, and the second transistor T2, the data-voltage-related voltage is written to the gate of the third transistor T3; and the data voltage is stored in the second capacitor C2; and Meanwhile, the second transistor T2 compensates for the threshold voltage of the third transistor T3. In this manner, the data voltage write and the threshold voltage compensation of the drive module 110 are achieved. The first capacitor C1 stores the gate voltage of the third transistor T3. The stored voltage is associated with the data voltage and the threshold voltage.

At a subthreshold swing compensation stage t2', the first scan signal S1 is at a low level, the second scan signal S2 is at a high level, the fourth transistor T4 is turned off, and the first transistor T1 and the second transistor T2 are turned on. The data voltage is stored on the second capacitor C2, so the data voltage on the second capacitor C2 can continue charging the gate of the third transistor T3 through the first transistor T1, the third transistor T3, and the second transistor T2. That is, at the subthreshold swing compensation stage t2', the first scan signal S1 output by the first scan line controls the auxiliary module 130 and the compensation module 140 to turn on, the second scan signal S2 output by the second scan line controls the data write module 120 to turn off, and the data voltage stored on the second capacitor C2 adjusts the voltage of the control terminal of the drive module 110 through the drive nodule 110 and the compensation module 140. When charging the gate of the third transistor T3 is charged through the second capacitor C2 at a low grayscale, the charging current is relatively small, so the voltage of the gate of the third transistor T3 can be finely adjusted, alleviating the non-uniform display effect caused by subthreshold swing discreteness of the third transistor T3 due to process reasons, achieving compensating for subthreshold swing and ensuring consistency of the drive currents generated by the drive module 110. In the t2' stage, the charging current generally is a small current. The time length corresponding to t2' is longer than the time length corresponding to t2 so that a change in a drive current caused by subthreshold swing discreteness at a low grayscale can be compensated for effectively.

In the compensation adjustment stage t3, the first transistor T1 and the second transistor T2 are off, the pulse voltage jumps from a high level to a low level. Due to the coupling effect of the third capacitor C3, the potential of the first node N1 changes, resulting in a voltage difference between the gate of the third transistor T3 and the first node. Since the second transistor T2 is off, under the action of leakage of the second sub-transistor T2-2, the gate voltage of the third transistor T3 can be finely adjusted, thereby making up for incomplete compensation for the third transistor T3 to ensure that a consistent drive current is generated by the third transistor T3 to improve the uniformity of the display brightness.

For details about the operation principles in the initialization stage t1 and the light emission stage t4, see related description of the pixel circuit of FIG. 9.

In this embodiment, the subthreshold swing of the third transistor T3 can be compensated for through both the second capacitor C2 and the third capacitor C3. The gate voltage of the third transistor T3 is increased through the second capacitor C2, and then the jump voltage V1 is coupled to the inside of the compensation module 140 through the third capacitor C3 so that the gate voltage of the third transistor T3 is finely adjusted. In this manner, the gate voltage of the third transistor T3 can be adjusted more finely and more precisely at a low grayscale, facilitating preciseness control of the generated drive current.

Embodiments of the present application can be combined with each to improve the compensation effect and improve the uniformity of the display brightness.

Figure 12:
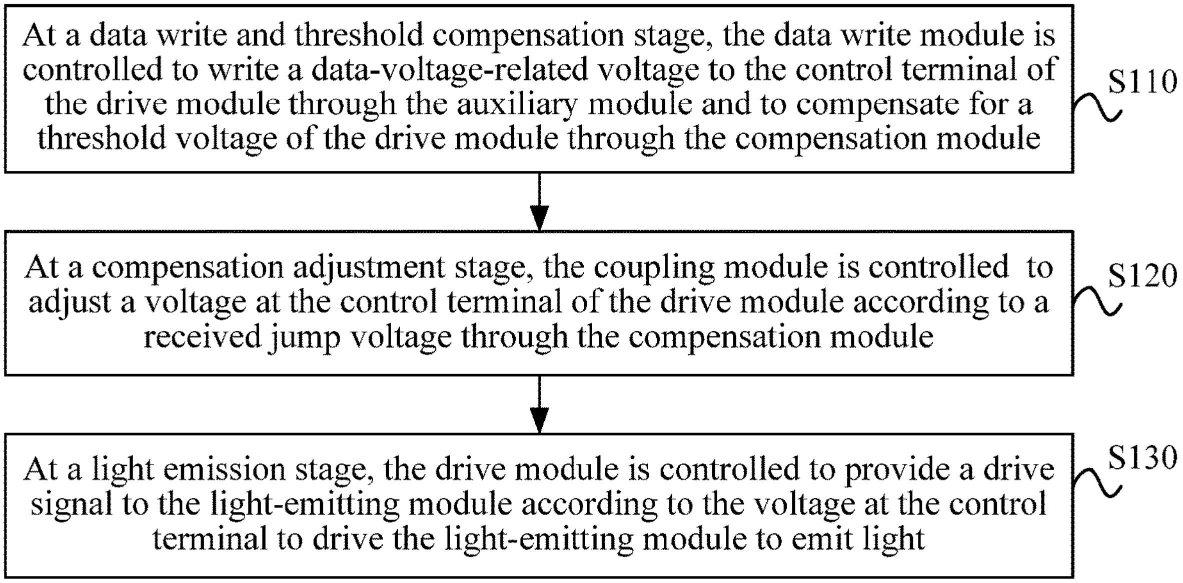
FIG. 12 is a flowchart of a driving method of a pixel circuit according to an embodiment of the present application.

An embodiment of the present application provides a driving method of a pixel circuit. FIG. 12 is a flowchart of a driving method of a pixel circuit according to an embodiment of the present application. Referring to FIGS. 1 and 12, the pixel circuit includes a drive module 110, a data write module 120, an auxiliary module 130, a compensation module 140, a storage module 150, a coupling module 160, and a light-emitting module 170. The data write module 120 is connected to the drive module 110 by the auxiliary module 130. The compensation module 140 is connected between a first terminal of the drive module 110 and a control terminal G of the drive module 110. The coupling module 160 is connected to the compensation module 140. The storage module 150 is connected to the control terminal G of the drive module 110.

The driving method of the pixel circuit includes S110, S120, and S130.

In S110, at a data write and threshold compensation stage, the data write module is controlled to write a data-voltage-related voltage to the control terminal of the drive module through the auxiliary module and to compensate for the threshold voltage of the drive module through the compensation module.

In S120, at a compensation adjustment stage, the coupling module is controlled to adjust a voltage at the control terminal of the drive module according to a received jump voltage through the compensation module.

In S130, at a light emission stage, the drive module is controlled to provide a drive signal to the light-emitting module according to the voltage at the control terminal to drive the light-emitting module to emit light.

In the driving method of the pixel circuit of this embodiment of the present application, at the data write and threshold compensation stage, the data write module and the compensation module are controlled to respond to different scan signals so that after a data voltage provided by a data line passes through the data write module, the auxiliary module, the drive module, and the compensation module, the data-voltage-related voltage is written to the control terminal of the drive module. In this manner, the data write and the threshold compensation of the drive module are achieved. After the threshold of the drive module is compensated for, the coupling module couples the jump voltage to the compensation module and finely adjusts the voltage at the control terminal of the drive module through the compensation module so that drive currents generated by different pixel circuits at the same grayscale voltage are consistent, thereby improving the threshold compensation effect and improving the uniformity of the display brightness. Moreover, the auxiliary module added enables a signal to be transmitted in an active layer, reducing the number of vias, optimizing the layout, reducing the layout area of pixels, and facilitating high PPI.

Further, referring to FIGS. 8 and 9, a control terminal of the auxiliary module 130 is connected to a first scan line S1, a control terminal of the compensation module 140 is connected to the first scan line S1, a control terminal of the data write module 120 is connected to a second scan line S2, the pixel circuit further comprises an initialization module 200, a first light emission control module 180, and a second light emission control module 190, a control terminal of the initialization module 200 is connected to a third scan line S3, a first terminal of the initialization module 200 is connected to an initialization signal line Vref, a second terminal of the initialization module 200 is connected to a first terminal of the light-emitting module 170, a control terminal of the first light emission control module 180 and a control terminal of the second light emission control module 190 are each connected to a light emission control signal line EM, a first terminal of the first light emission control module 180 is connected to a first power line VDD, a second terminal of the first light emission control module 180 is connected to a second terminal of the drive module 110, a first terminal of the second light emission control module 190 is connected to the first terminal of the drive module 110, a second terminal of the second light emission control module 190 is connected to the first terminal of the light-emitting module 170, and a second terminal of the light-emitting module 170 is connected to a second power line VSS.

The auxiliary module 130 includes a first transistor T1. The compensation module 140 includes a second transistor T2. The second transistor T2 is a double-gate transistor. The drive module 110 includes a third transistor T3. The data write module 120 includes a fourth transistor T4. The first light emission control module 180 includes a fifth transistor T5. The second light emission control module 190 includes a sixth transistor T6. The initialization module 200 includes a seventh transistor T7. In conjunction with control timing of FIG. 10, the driving method of the pixel circuit of this embodiment of the present application includes the following steps.

At an initialization stage t1, a first scan signal S1 output by the first scan line controls the auxiliary module 130 and the compensation module 140 to turn on; a third scan signal S3 output by the third scan line controls the initialization module 200 to turn on; and a light emission control signal EM output by the light emission control signal line controls the first light emission control module 180 and the second light emission control module 190 to turn on. The initialization voltage Vref on the initialization signal line is transmitted to the first electrode of the OLED and is transmitted to the gate of the third transistor T3 through the sixth transistor T6 and the second transistor T2 to initialize the potential of the gate of the third transistor T3 and the potential of the first electrode of the OLED. Meanwhile, the fifth transistor T5 is turned on, and the third transistor T3 is turned on by the configured initialization voltage Vref; therefore, a path is formed between the first power line VDD, the fifth transistor T5, the third transistor T3, the sixth transistor T6, the seventh transistor T7, and the initialization signal line Vref. The third transistor T3 generates a current to flush the charge in the third transistor T3 so that the charge amount in the third transistor T3 is initialized to the charge amount corresponding to the initialization voltage Vref, thereby reducing the characteristic shift of the third transistor T3 caused by the hysteresis effect and thus alleviating the afterimage.

In this embodiment, since the second transistor T2 is a double-gate transistor, which has a smaller leakage current than the single-gate transistor, and there is only one leakage path of the gate voltage of the third transistor T3, so that the stability of the gate voltage of the third transistor T3 can be maintained, thereby facilitating improvement of the display effect.

At the data write and threshold compensation stage t2, the first scan signal S1 output by the first scan line controls the auxiliary module 130 and the compensation module 140 to turn on; and a second scan signal S2 output by the second scan line controls the data write module 120 to turn on. After the data voltage on the data line Data passes through the fourth transistor T4, the first transistor T1, the third transistor T3, and the second transistor T2, the data-voltage-related voltage is written to the gate of the third transistor T3; and meanwhile, the second transistor T2 compensates for the threshold voltage of the third transistor T3. In this manner, the data voltage write and the threshold voltage compensation of the drive module 110 are achieved. The first capacitor C1 stores the gate voltage of the third transistor T3. The stored voltage is associated with the data voltage and the threshold voltage.

At the compensation adjustment stage t3, the first scan signal S1 output by the first scan line controls the auxiliary module 130 and the compensation module 140 to turn off and controls the coupling module 160 to adjust the voltage of the control terminal G of the drive module 110 according to the received jump voltage through the compensation module 140. After the first scan signal S1 jumps from a low level to a high level (that is, after the second transistor T2 is turned off), the pulse voltage at one terminal of the third capacitor C3 jumps from a high level to a low level. Under the coupling effect of the third capacitor C3, the potential of the first node N1 changes, resulting in a voltage difference between the gate of the third transistor T3 and the first node. Since the second transistor T2 is off, under the action of leakage of the second sub-transistor T2-2, the gate voltage of the third transistor T3 can be finely adjusted, thereby making up for incomplete compensation for the third transistor T3 to ensure that a consistent drive current is generated by the third transistor T3 to improve the uniformity of the display brightness.

At the light emission stage t4, a light emission control signal EM output by the light emission control signal line controls the first light emission control module 180 and the second light emission control module 190 to turn on. The third transistor T3 generates a drive current under the control of the gate voltage of the third transistor T3. Since the gate voltage has been adjusted in the previous stage, it can ensure that the OLED has the same drive current at the same grayscale voltage at the light emission stage t4, improving the uniformity of the display brightness.

Figure 13:
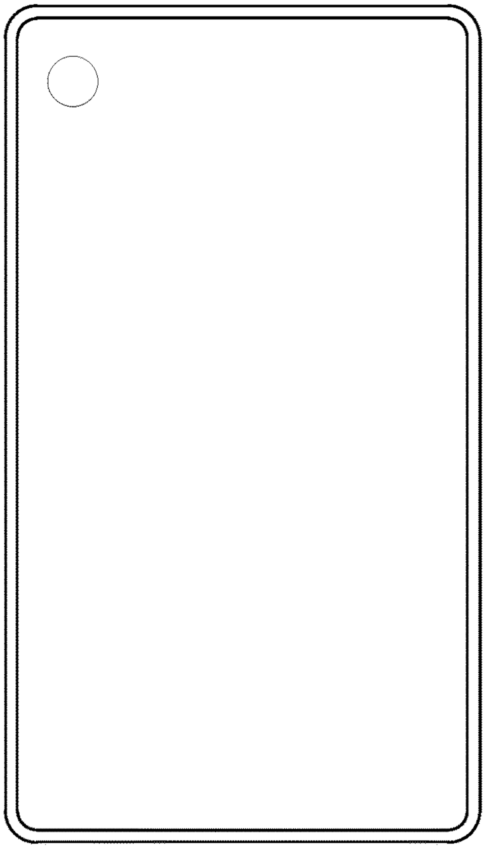
FIG. 13 is a diagram illustrating the structure of a display panel according to an embodiment of the present application.

An embodiment of the present application provides a display panel. The display panel includes the pixel circuit of any embodiment of the present application. FIG. 13 is a diagram illustrating the structure of a display panel according to an embodiment of the present application. FIG. 13 shows the display panel of a cellphone. The display panel is applicable to tablets, watches, wearable devices, on-board displays, camera displays, television screens, computer screens, and other display-related devices. The display panel includes the pixel circuit of any embodiment of the present application; therefore, the display panel of this embodiment of the present application has the beneficial effects described in any embodiment of the present application.

It is to be noted that the above are only preferred embodiments of the present application and the principles used therein. It will be understood by those skilled in the art that the present application is not limited to the specific embodiments described herein. Those skilled in the art can make various apparent variations, adaptions, and substitutions without departing from the scope of the present application. Therefore, while the present application has been described in detail via the preceding embodiments, the present application is not limited to the preceding embodiments and may include more other equivalent embodiments without departing from the concept of the present invention. The scope of the present application is determined by the scope of the appended claims.

What is claimed is:

1. A pixel circuit, comprising a drive module, a data write module, an auxiliary module, a compensation module, a storage module, a coupling module, and a light-emitting module, wherein the data write module is configured to write a data-voltage-related voltage to a control terminal of the drive module through the auxiliary module;

the compensation module is connected between a first terminal of the drive module and the control terminal of the drive module and is configured to compensate for a threshold voltage of the drive module;

the coupling module is connected to the compensation module and is configured to adjust a voltage at the control terminal of the drive module according to a received jump voltage through the compensation module;

the storage module is connected to the control terminal of the drive module and is configured to store the voltage at the control terminal of the drive module; and the drive module is configured to provide a drive signal to the light-emitting module according to the voltage at the control terminal to drive the light-emitting module to emit light.

2. The pixel circuit of claim 1, wherein the storage module comprises a first capacitor, wherein a first electrode of the first capacitor is connected to a fixed voltage, and a second electrode of the first capacitor is connected to the control terminal of the drive module.

3. The pixel circuit of claim 1, wherein the auxiliary module comprises a first transistor, wherein a gate of the first transistor is connected to a first scan line, a first electrode of the first transistor is connected to a second terminal of the data write module, a second electrode of the first transistor is connected to a second terminal of the drive module, and a first terminal of the data write module is connected to a data line.

4. The pixel circuit of claim 1, wherein the auxiliary module comprises a first transistor and a second capacitor, wherein a gate of the first transistor is connected to a first scan line, a first electrode of the first transistor is connected to a second terminal of the data write module, a second electrode of the first transistor is connected to a second terminal of the drive module, a first terminal of the data write module is connected to a data line, a first terminal of the second capacitor is connected to a fixed voltage, and a second terminal of the second capacitor is connected to the first electrode of the first transistor or the second electrode of the first transistor.

5. The pixel circuit of claim 1, wherein the compensation module comprises a second transistor, wherein the second transistor is a double-gate transistor that comprises a first sub-transistor and a second sub-transistor, wherein a gate of the first sub-transistor and a gate of the second sub-transistor are each connected to a first scan line, a first electrode of the first sub-transistor is connected to the first terminal of the drive module, a second electrode of the first sub-transistor is connected to a first electrode of the second sub-transistor, and a second electrode of the second sub-transistor is connected to the control terminal of the drive module.

6. The pixel circuit of claim 5, wherein the jump voltage is a pulse voltage, the coupling module comprises a third capacitor, a first electrode of the third capacitor is connected to the pulse voltage, and a second electrode of the third capacitor is connected to the first electrode of the second sub-transistor.

7. The pixel circuit of claim 1, wherein the compensation module comprises a second transistor, wherein the second transistor is a tri-gate transistor that comprises a first sub-transistor, a second sub-transistor, and a third sub-transistor, wherein a gate of the first sub-transistor, a gate of the second sub-transistor, and a gate of the third sub-transistor are each connected to a first scan line, a first electrode of the first sub-transistor is connected to the first terminal of the drive module, a second electrode of the first sub-transistor is connected to a first electrode of the second sub-transistor, a second electrode of the second sub-transistor is connected to a first electrode of the third sub-transistor, and a second electrode of the third sub-transistor is connected to the control terminal of the drive module.

8. The pixel circuit of claim 7, wherein the coupling module is configured to couple the jump voltage to at least one of the first electrode of the second sub-transistor or the second electrode of the second sub-transistor.

9. The pixel circuit of claim 8, wherein the jump voltage is a pulse voltage, and the coupling module comprises a third capacitor and a fourth capacitor, wherein a first electrode of the third capacitor is connected to the pulse voltage, a second electrode of the third capacitor is connected to the second electrode of the second sub-transistor, a first electrode of the fourth capacitor is connected to the pulse voltage or a fixed voltage, and a second electrode of the fourth capacitor is connected to the first electrode of the second sub-transistor.

10. The pixel circuit of claim 1, wherein the compensation module comprises a second transistor, wherein the second transistor is a four-gate transistor that comprises a first sub-transistor, a second sub-transistor, a third sub-transistor, and a fourth sub-transistor, wherein a gate of the first sub-transistor, a gate of the second sub-transistor, a gate of the third sub-transistor, and a gate of the fourth sub-transistor are each connected to a first scan line, a first electrode of the first sub-transistor is connected to the first terminal of the drive module, a second electrode of the first sub-transistor is connected to a first electrode of the second sub-transistor, a second electrode of the second sub-transistor is connected to a first electrode of the third sub-transistor, a second electrode of the third sub-transistor is connected to a first electrode of the fourth sub-transistor, and a second electrode of the fourth sub-transistor is connected to the control terminal of the drive module; and the coupling module is configured to couple the jump voltage to at least one of the first electrode of the second sub-transistor, the second electrode of the second sub-transistor, or the second electrode of the third sub-transistor.

11. The pixel circuit of claim 10, wherein the jump voltage is a pulse voltage, and the coupling module comprises a third capacitor, a fourth capacitor, and a fifth capacitor, wherein a first electrode of the third capacitor is connected to the pulse voltage, a second electrode of the third capacitor is connected to the second electrode of the third sub-transistor, a first electrode of the fourth capacitor is connected to the pulse voltage or a fixed voltage, a second electrode of the fourth capacitor is connected to the second electrode of the second sub-transistor, a first electrode of the fifth capacitor is connected to the pulse voltage or a fixed voltage, and a second electrode of the fifth capacitor is connected to the second electrode of the first sub-transistor.

12. The pixel circuit of claim 6, wherein a pulse of the pulse voltage is after a pulse signal transmitted on the first scan line.

13. The pixel circuit of claim 12, wherein the pulse voltage jumps from a high level to a low level after the compensation module is turned off and jumps from a low level to a high level before the light-emitting module emits light; or the pulse voltage jumps from a low level to a high level after the compensation module is turned off and jumps from a high level to a low level before the light-emitting module emits light.

14. The pixel circuit of claim 1, wherein a control terminal of the auxiliary module and a control terminal of the compensation module are each connected to a first scan line, the pixel circuit further comprises a first light emission control module and a second light emission control module, the drive module comprises a third transistor, the data write module comprises a fourth transistor, the first light emission control module comprises a fifth transistor, and the second light emission control module comprises a sixth transistor, wherein a gate of the fourth transistor is connected to a second scan line, a first electrode of the fourth transistor is connected to a data line, a second electrode of the fourth transistor is connected to a first electrode of the third transistor through the auxiliary module, a first electrode of the fifth transistor is connected to a first power line, a second electrode of the fifth transistor is connected to the first electrode of the third transistor, a second electrode of the third transistor is connected to a first terminal of the light-emitting module through the sixth transistor, a second terminal of the light-emitting module is connected to a second power line, and a gate of the fifth transistor and a gate of the sixth transistor are each connected to a light emission control signal line; and the fifth transistor and the sixth transistor are configured to be on at an initialization stage and a light emission stage.

15. The pixel circuit of claim 14, further comprising an initialization module, wherein the initialization module includes a seventh transistor, wherein a first electrode of the seventh transistor is connected to an initialization signal line, a second electrode of the seventh transistor is connected to the first terminal of the light-emitting module, and a gate of the seventh transistor is connected to a third scan line.

16. The pixel circuit of claim 15, wherein the first scan line, the second scan line, the third scan line, and the light emission control signal line are each configured to transmit a scan signal to satisfy:

at the initialization stage, the auxiliary module, the compensation module, the initialization module, the first light emission control module, and the second light emission control module are turned on;

at a data write and threshold compensation stage, the data write module, the auxiliary module, and the compensation module are turned on;

at a compensation adjustment stage, the auxiliary module and the compensation module are turned off; and at the light emission stage, the first light emission control module and the second light emission control module are turned on.

17. A driving method of a pixel circuit, wherein the pixel circuit comprises a drive module, a data write module, an auxiliary module, a compensation module, a storage module, a coupling module, and a light-emitting module, wherein the data write module is connected to the drive module through the auxiliary module, the compensation module is connected between a first terminal of the drive module and a control terminal of the drive module, the coupling module is connected to the compensation module, and the storage module is connected to the control terminal of the drive module; and the driving method of the pixel circuit comprises:

at a data write and threshold compensation stage, controlling the data write module to write a data-voltage-related voltage to the control terminal of the drive module through the auxiliary module and to compensate for a threshold voltage of the drive module through the compensation module;

at a compensation adjustment stage, controlling the coupling module to adjust a voltage at the control terminal of the drive module according to a received jump voltage through the compensation module; and at a light emission stage, controlling the drive module to provide a drive signal to the light-emitting module according to the voltage at the control terminal to drive the light-emitting module to emit light.

18. The driving method of the pixel circuit of claim 17, wherein a control terminal of the auxiliary module is connected to a first scan line, a control terminal of the compensation module is connected to the first scan line, a control terminal of the data write module is connected to a second scan line, the pixel circuit further comprises an initialization module, a first light emission control module, and a second light emission control module, a control terminal of the initialization module is connected to a third scan line, a first terminal of the initialization module is connected to an initialization signal line, a second terminal of the initialization module is connected to a first terminal of the light-emitting module, a control terminal of the first light emission control module and a control terminal of the second light emission control module are each connected to a light emission control signal line, a first terminal of the first light emission control module is connected to a first power line, a second terminal of the first light emission control module is connected to a second terminal of the drive module, a first terminal of the second light emission control module is connected to the first terminal of the drive module, a second terminal of the second light emission control module is connected to the first terminal of the light-emitting module, and a second terminal of the light-emitting module is connected to a second power line; and the driving method of the pixel circuit comprises:

at an initialization stage, controlling the auxiliary module and the compensation module to turn on by a first scan signal output by the first scan line; controlling the initialization module to turn on by a third scan signal output by the third scan line; and controlling the first light emission control module and the second light emission control module to turn on by a light emission control signal output by the light emission control signal line;

at the data write and threshold compensation stage, controlling the auxiliary module and the compensation module to turn on; and controlling, by a second scan signal output by the second scan line, the data write module to turn on;

at the compensation adjustment stage, controlling the auxiliary module and the compensation module to turn off by the first scan signal output by the first scan line and controlling the coupling module to adjust the voltage at the control terminal of the drive module according to the received jump voltage through the compensation module; and at the light emission stage, controlling the first light emission control module and the second light emission control module to turn on by a light emission control signal output by the light emission control signal line.

19. The driving method of the pixel circuit of claim 17, wherein a control terminal of the compensation module is connected to the first scan line, a control terminal of the data write module is connected to a second scan line, the auxiliary module comprises a first transistor and a second capacitor, a gate of the first transistor is connected to the first scan line, a first electrode of the first transistor is connected to a second terminal of the data write module, a second electrode of the first transistor is connected to a second terminal of the drive module, a first terminal of the second capacitor is connected to a fixed voltage, and a second terminal of the second capacitor is connected to a first electrode of the first transistor or a second electrode of the first transistor; and the driving method of the pixel circuit comprises:

at a subthreshold swing compensation stage, controlling the auxiliary module and the compensation module to turn on by a first scan signal output by the first scan line; controlling, the data write module to turn off by a second scan signal output by the second scan line; and adjusting the voltage at the control terminal of the drive module through the drive module and the compensation module by a data voltage stored on the second capacitor.

20. A display panel, comprising the pixel circuit of claim 1.

* * * * *